United States Patent
Ganesan et al.

(10) Patent No.: US 10,397,417 B1
(45) Date of Patent: Aug. 27, 2019

(54) METHODS AND SYSTEMS FOR PRINTING SELECTIVE PORTIONS OF DOCUMENTS

(71) Applicant: XEROX CORPORATION, Norwalk, CT (US)

(72) Inventors: Muthu Kumar Ganesan, Guduvanchery (IN); Swapna Subbaian, Chennai (IN); Divya Thiruvenkada Krishnan, Guduvanchery (IN); Manoj Elangovan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/016,706

(22) Filed: Jun. 25, 2018

(51) Int. Cl.
*H04N 1/00* (2006.01)
*G06F 3/12* (2006.01)
*G06K 9/00* (2006.01)

(52) U.S. Cl.
CPC ......... *H04N 1/00461* (2013.01); *G06F 3/122* (2013.01); *G06F 3/1241* (2013.01); *G06K 9/00456* (2013.01); *G06K 9/00469* (2013.01); *H04N 1/00411* (2013.01)

(58) Field of Classification Search
CPC ............ H04N 1/00461; H04N 1/00411; G06F 3/1241; G06K 9/00469; G06F 3/122
USPC ........................................................ 358/1.15
See application file for complete search history.

(56) References Cited

U.S. PATENT DOCUMENTS

| | | | |
|---|---|---|---|
| 2006/0050292 A1* | 3/2006 | Morikawa | H04N 1/32122 358/1.13 |
| 2007/0026371 A1* | 2/2007 | Wood | G09B 5/062 434/317 |
| 2015/0304521 A1* | 10/2015 | Campanelli | G06K 15/1889 358/1.18 |

* cited by examiner

*Primary Examiner* — Saeid Ebrahimi Dehkordy (57) ABSTRACT

The present disclosure discloses methods and systems for printing selective portions of a document. The method includes receiving a removable storage device by a multi-function device, the removable storage device includes a document having a table of content listing a plurality of topics and content corresponding to each topic. The table of content is identified, extracted and printed. After printing the table of content, one or more topics are highlighted by a user in the printed version of the table of content. The printed version of the table of content with the one or more highlighted topics, is received for scanning. Upon scanning, the one or more highlighted topics are identified and thereafter, content corresponding to the one or more highlighted topics is identified and printed. In this manner, the selective portions of the document is printed.

20 Claims, 5 Drawing Sheets

METHODS AND SYSTEMS FOR PRINTING SELECTIVE PORTIONS OF DOCUMENTS

TECHNICAL FIELD

The present disclosure relates to printing operations and in particular, to systems and methods for printing selective portions of documents.

BACKGROUND

Typically, a user needs a print driver or a computing system or the Internet connectivity for printing operations, for example, printing a complete document or printing a certain number of pages of a document. Moreover, the user can print certain portions of a document for which the user requires an application. The application allows the user to select the portion to be printed and further allows him to give printing instructions.

However, in absence of any such facilities (i.e., print driver, etc.), the user cannot print selective portions of the document. Therefore, in such cases, a complete document has to be printed and then the user has to hand-pick the portions of the document that are actually needed. This approach leads to unnecessary wastage of toner, pages, and power supply and further poses inconvenience to the user with regard to handling of the printed document in order to hand-pick the portions that are relevant. These issues aggravate in case of large documents having hundreds or thousands of pages, such as thesis, books, project documents, and so on.

In situations, where the user does not have a print driver/computing system/Internet connection but has a requirement of printing a large document. The USB printing is the only choice available for the user. For example, the user has a document with 500 pages having more than 20 chapters. But the user wants to print only 6th and 9th chapters from the large page document. The USB printing or other existing technologies do not provide an option to selectively print as per user's needs without a print driver, a PC, a network connection or the internet connection. Therefore, there is a need for efficient methods and systems to overcome the above mentioned challenges.

SUMMARY

This summary is provided to introduce concepts related to printing selective portions of a document. These concepts are further described below in the detailed description. This summary is not intended to identify essential features of the claimed subject matter nor is it intended for use in determining or limiting the scope of the claimed subject matter.

A method is disclosed. The method includes receiving a removable storage device by a multi-function device, wherein the removable storage device includes a document having a table of content listing a plurality of topics and content corresponding to each topic. The document is stored in a temporary memory of the multi-function device. The table of content in the document is identified based on one or more text recognition techniques. Here, only the table of content is printed, wherein one or more topics of the plurality of topics are highlighted by a user in the printed version of the table of content. The printed version of the table of content with the one or more highlighted topics, is received for scanning. The one or more highlighted topics are identified from the printed version of the table of content. Then, content corresponding to the identified one or more highlighted topics is identified. Finally, the identified content is printed. The identified content corresponds to the identified one or more highlighted topics.

A computer-implemented method for printing selective portions of a document stored in a removable storage device coupled to a printing device, is disclosed. A document is received via a removable storage device, the document having a table of content and content section, wherein the table of content includes a plurality of topics and corresponding page numbers. The document is analyzed to identify the table of content, based on at least one text identification technique. Then, an option is automatically displayed to print the table of content. The table of content is extracted from the document. The extracted table of content is printed, based on an instruction from a user. A printed version of the table of content having at least one topic and corresponding page number highlighted in visible color is received, for scanning. The at least one highlighted topic and corresponding page number is detected. Then, content corresponding to the at least one highlighted topic and corresponding page number, is identified. The content corresponding to the at least one highlighted topic and corresponding page number is extracted. Finally, content corresponding to the at least one highlighted topic is printed.

A system includes a removable storage device and a multi-function device. The removable storage device is communicatively coupled to the multi-function device, the removable storage device includes a document having a table of content listing a plurality of topics and content corresponding to each topic. The multi-function device includes one or more modules configured for: storing the document in a temporary memory of the multi-function device; identifying the table of content in the document based on one or more text recognition techniques; printing only the table of content, wherein one or more topics of the plurality of topics are highlighted by a user in the printed version of the table of content; receiving the table of content with the one or more highlighted topics for scanning; performing Optical Character Recognition (OCR) to identify the one or more topics highlighted in the table of content; identifying content corresponding to the identified one or more highlighted; and printing the identified content, the identified content corresponds to the identified one or more highlighted topics.

A multi-function device for printing a selective portion of large-sized document present in a removable storage device is disclosed. The multi-function device is configured for: receiving a document via a removable storage device, the document having a table of content, wherein the table of content comprises a plurality of topics; printing only the table of content; receiving a printed version of the table of content having at least one topic highlighted in visible color, for scanning; detecting the at least one highlighted topic from the printed version of the table of content; identifying content corresponding to the at least one highlighted topic; and printing content corresponding to the at least one highlighted topic.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or a combination thereof. In context of the current disclosure, the multi-function device is configured to print selective portion of a document stored in a removable storage device. The multi-function device may interchangeably be used with the phrase "printer" or a "printing device". This will be discussed subsequently in the detailed description.

The phrase "document" refers to a virtual or software form (embodied in a software file). The virtual form can be referred to as digital form, electronic version or the like. The document includes a title section, a table of content and main content/content. When the table of content is printed, the printed table of content is referred to as a printed version. The printed version is the physical form such as printed on paper.

The term "table of content" refers to an index of the document listing a plurality of topics. The topics may further include one or more sub-topics. The topics may further be presented with a page number (i.e., a starting page number and/or an ending page number). The table of content may also be referred to as 'table", "index", "TOC", or the like.

The term "main content" includes details of each topic/sub-topic as per the table of content. The main content may include text, image, graphic or a combination of these. The main content can be exhaustive, descriptive and may not necessarily include text, image, or graphic.

The term "highlighting" refers to marking in the printed version of the table of content. The highlighting includes highlighting of one or more topics that the user wishes to print. The highlighting may be performed using a conventional pen, paper, marker, or any of the known or later developed methods/techniques.

The term "removable storage device" refers to any device that is communicatively coupled to the multi-function device as needed and can be removed from the multi-function device. The removable storage device stores a document, a portion of the document to be printed by the multi-function device. One such example is, but not limited to, a Universal Serial Bus (USB).

Overview

The present disclosure provides methods and systems for printing selective portions of a document, i.e., to print based on one or more topics as highlighted in a table of content. The methods and systems are implemented for scenarios where a user does not have access to at least one of a print driver, a personal computing device, and the Internet connectivity and further the document is stored in any removable storage device. To this end, the methods and systems begin with first printing only a table of content of a document. A user then highlights one or more topics using visible color that he wishes to print. The printed table of content with the highlighted topics is scanned. Then, printing is performed based on the highlighted topics. More details on the methods, systems, and implementation of the disclosure will be discussed in FIGS. 1-4 with the help of examples.

A method is disclosed. The method includes receiving a removable storage device by a multi-function device, wherein the removable storage device includes a document having a table of content listing a plurality of topics and content corresponding to each topic. The document is stored in a temporary memory of the multi-function device. The table of content in the document is identified based on one or more text recognition techniques. Here, only the table of content is printed, wherein one or more topics of the plurality of topics are highlighted by a user in the printed version of the table of content. The printed version of the table of content with the one or more highlighted topics, is received for scanning. The one or more highlighted topics are identified from the printed version of the table of content. Then, content corresponding to the identified one or more highlighted topics is identified. Finally, the identified content is printed. The identified content corresponds to the identified one or more highlighted topics.

The method includes extracting the one or more highlighted topics. The method includes performing Optical Character Recognition (OCR) to identify the one or more highlighted topics. The method includes automatically displaying an option to print the table of content. The method includes printing the table of content automatically. The method includes analyzing the document to identify the table of content.

A computer-implemented method for printing selective portions of a document stored in a removable storage device coupled to a printing device, is disclosed. A document is received via a removable storage device, the document having a table of content and content section, wherein the table of content includes a plurality of topics and corresponding page numbers. The document is analyzed to identify the table of content, based on at least one text identification technique. Then, an option is automatically displayed to print the table of content. The table of content is extracted from the document. The extracted table of content is printed, based on an instruction from a user. A printed version of the table of content having at least one topic and corresponding page number highlighted in visible color is received, for scanning. The at least one highlighted topic and corresponding page number is detected. Then, content corresponding to the at least one highlighted topic and corresponding page number, is identified. The content corresponding to the at least one highlighted topic and corresponding page number is extracted. Finally, content corresponding to the at least one highlighted topic is printed.

The computer-implemented method includes storing the document in a temporary memory of the printing device. The table of content is printed automatically. The table of content is printed based on one or more page numbers as specified by the user. The computer-implemented method further includes extracting content corresponding to the at least one highlighted topic and corresponding page number. The computer-implemented method includes matching at least one of: the at least one highlighted topic and corresponding page number with the content section of the document stored in the printing device.

A system includes a removable storage device and a multi-function device. The removable storage device is communicatively coupled to the multi-function device, the removable storage device includes a document having a table of content listing a plurality of topics and content corresponding to each topic. The multi-function device includes one or more modules configured for: storing the document in a temporary memory of the multi-function device; identifying the table of content in the document based on one or more text recognition techniques; printing only the table of content, wherein one or more topics of the plurality of topics are highlighted by a user in the printed version of the table of content; receiving the table of content with the one or more highlighted topics for scanning; performing Optical Character Recognition (OCR) to identify the one or more topics highlighted in the table of content; identifying content corresponding to the identified one or more highlighted; and printing the identified content, the identified content corresponds to the identified one or more highlighted topics.

The multi-function device is configured for extracting the one or more topics highlighted in the printed version of the table of content. The multi-function device is configured for displaying an option to print the table of content. The multi-function device is configured for printing the table of content automatically. The multi-function device is configured for printing the table of content based on an instruction from the user. The multi-function device is configured for matching the one or more highlighted topics with the content of the document.

A multi-function device for printing a selective portion of large-sized document present in a removable storage device is disclosed. The multi-function device is configured for: receiving a document via a removable storage device, the document having a table of content, wherein the table of content comprises a plurality of topics; printing only the table of content; receiving a printed version of the table of content having at least one topic highlighted in visible color, for scanning; detecting the at least one highlighted topic from the printed version of the table of content; identifying content corresponding to the at least one highlighted topic; and printing content corresponding to the at least one highlighted topic.

The multi-function device is further configured for identifying and extracting the table of content.

Exemplary Environment

Figure 1:
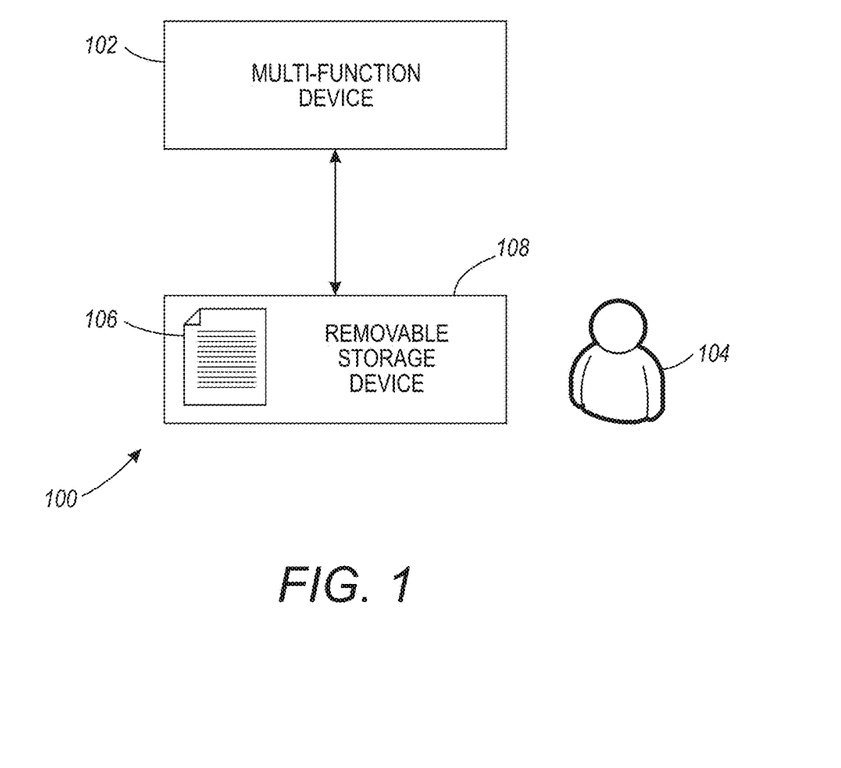
FIG. 1 illustrates an exemplary environment in which various embodiment of the disclosure can be practiced.

FIG. 1 illustrates an exemplary environment 100 in which various embodiments of the disclosure can be practiced. The environment 100 includes a multi-function device 102, a user 104, a document 106, and a removable storage device 108. In general, the multi-function device 102 is used by the user 104 for his day-to-day activities such as printing, copying, scanning, faxing, or the like. In context of the present disclosure, the multi-function device 102 is used by the user 104 for printing selective portions of the document 106 stored in the removable storage device 108. To this end, the multi-function device 102 is configured to print selective portions of the document 106 based on highlighting as performed by the user 104, i.e., based on one or more highlighted topics.

As shown, the document 106 is a multi-page document such as a book, thesis, a journal, a report, a user guide, a project document and so forth. The document 106 may be a word document, a PDF, an e-book or the like. The document 106 is a large-sized document with hundreds and thousands of pages but the disclosure may be implemented for any size of document without limiting the scope of the disclosure. The document 106 includes a title section, a table of content and main content. The title section represents heading of the document 106. The table of content lists a plurality of topics, i.e., topic titles, the topics identify the main content present in the document 106. The topics may be associated with one or more page numbers, i.e., a starting page number and/or an ending page number. The topics may further include one or more sub-topics. The main content represents the detailed description of topics as present in the table of content. For example, the main content carries the detailed description of a book, thesis and so on. The main content is in the form of text, image, graphic or a combination thereof. It may be noted that the table of content may further include one or more sub-topics corresponding to each topic. For easy discussion, the disclosure is discussed with respect to topics, however, for a person skilled in the art, it is understood that disclosure can be implemented in the same manner for sub-topics as well. The sub-topic may be referred to as a sub-heading or a sub-title.

The removable storage device 108 stores the document 106 that the user 104 wishes to print. The removable storage device 108 may store other documents of the user 104 without deviating from the scope of the disclosure. The removable storage device 108 is coupled to the multi-function device 102 using known ports. The removable data storage 108 may include, but is not limited to, a hard disk or a Universal Serial Bus (USB) device. The document 106 is transferred from the removable storage device 108 to the multi-function device 102. For example, the document 106 may be transferred through proprietary USB/RS232. The document 106 may be transferred through handheld storage, mobile phone storage/music/video player storage through USB OTG—On-the-Go with or without wireless capabilities. The document 106 may be transferred through Universal Serial Bus with or without wireless capabilities.

Here, the multi-function device 102 receives the document 106, prints the table of content of the document 106, receives the printed version of the table of content with one or more topics as highlighted by the user 104, identifies the highlighted topics of the table of content, identifies main content/content corresponding to the highlighted topics and prints only the identified main content corresponding to the highlighted topics by the user 104. In this manner, the multi-function device 102 prints only the pages/content that is needed by the user 104 and therefore the present disclosure offers a comprehensive, cost-effective, convenient, and time saving technique for selective printing of portions of the document 106.

Exemplary System

Figure 2:
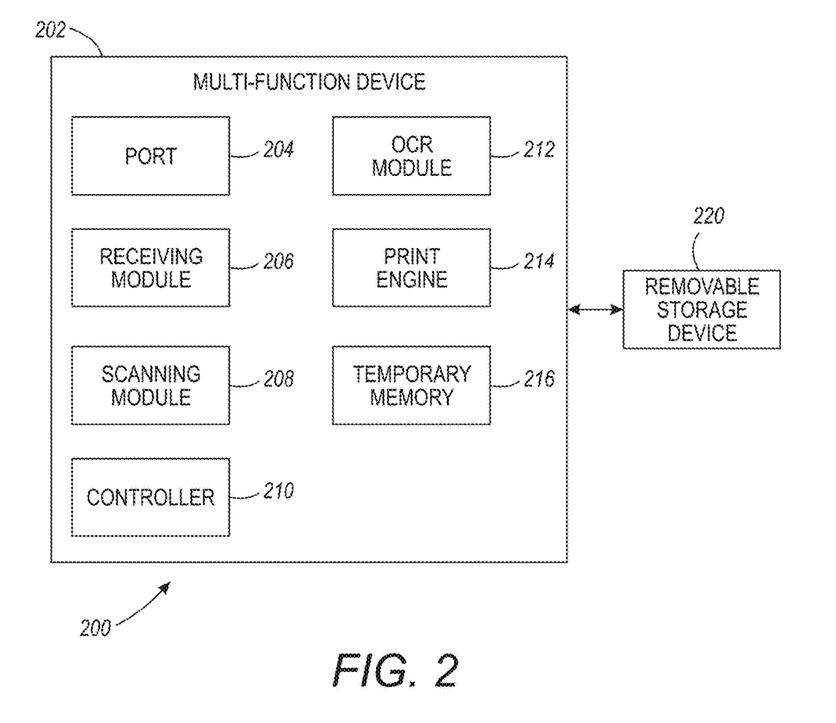
FIG. 2 illustrates an overall system for printing selective portions of a document, according to one or more embodiments of the present disclosure.

FIG. 2 illustrates an overall system 200 for printing selective portions of a document. The system includes a multi-function device 202 and a removable storage device 220 that is communicatively coupled to the multi-function device 202. The multi-function device 202 includes a port 204, a receiving module 206, a scanning module 208, a controller 210, an Optical Character Recognition (OCR) module 212, a print engine 214, and a temporary memory 216. Each of the components 204, 206, 208, 210, 212, 214, and 216 are coupled to each other via a communication bus or later developed protocols and also each of the components communicate with each other for implementing the current disclosure. The multi-function device 202 may include one or more additional components such as a processor as required to implement the current disclosure.

The system 200 prints selective portions of a document, i.e., prints according to highlighting done by a user in a table of content of the document. The document includes the table of content and main content. The table of content includes a plurality of topics. The topics may include one or more sub-topics. In the table of content, the topics may be associated with one or more page numbers.

The port 204 receives the removable storage device 220 storing the document. The document may be present in a pre-defined folder in the removable storage device 220. The document is the one that the user wishes to print. Upon receiving the removable storage 220, the controller 210 automatically detects the removable storage device 220 coupled to the multi-function device 202. The controller 210 copies the document from the removable storage device 220 and stores the document in the temporary memory 216 of the multi-function device 202.

The controller 210 analyzes the document stored in the temporary memory 216 of the multi-function device 202. The controller 210 identifies the table of content of the document. The table of content can be identified using one or more text recognition techniques such as keywords. For example, the table of content can be identified based on keywords such as TOC, index and so on. Here, the controller 210 may search for terms including, but not limited to, "table of content", "table-of-content", and "index" in the document. Any page of the document having one or more of the above-mentioned terms may be identified as the table of content. The controller 210 may detect the above-mentioned terms in a top half of pages of the document, based on factors including, but not limited to, a font of the text, a size of the text, and alignment of the text.

Once the controller 210 completes the identification of the table of content, the controller 210 passes an instruction to the print engine 214 to print the table of content. In context of the present disclosure, the controller 210 prints only the table of content instead of the complete document.

The table of content may be printed automatically. In some embodiments, the controller 210 may print the table of content based on an instruction from the user. In such cases, the controller 210 may display the table of content via a user interface of the multi-function device 202 and prompts the user to print the table of content. The prompt may require the user to input one or more page numbers or page ranges for printing the table of content. It is considered that the user knows the page numbers or page ranges in advance associated with the table of content. In some cases, the prompt may indicate page numbers of the table of content for confirmation from the user.

Further, the table of content differs from document to document. For example, the table of content for a word document may appear different from table of content of a PDF document. Further, in some documents, the table of content may include page numbers in hyphenated manner (e.g., 10-22) next to the topic. In such cases, a mere highlighting is sufficient. While in certain documents, the table of content may only include the starting page numbers next to the topic. In such cases, the user inputs a hyphen with the ending page number. Therefore, either the user may confirm the indicated page numbers of the table of content for printing or the user may provide the page numbers of the table of content. In this manner, the table of content is identified and printed as discussed above.

The entire table of content may be printed. The table of content may be printed partially, i.e., based on inputs from the user, i.e., based on page numbers as mentioned above.

The user then collects the printed version of the table of content and highlights one or more topics to be printed. The topics may be highlighted using a conventional pen, pencil, marker or any medium that can be recognized by the multi-function device 202. The highlighting is performed such that the highlighting or the color of the highlighting should not mask the topics and their corresponding page numbers. This helps easy recognition at the time of performing OCR step. The user then inputs the printed version of the table of content with the one or more highlighted topics to the multi-function device 202.

The receiving module 206 receives the printed version of the table of content (i.e., physical form) with the one or more topics as highlighted by the user. The controller 210 passes the printed version of the table of content to the scanning module 208 for further processing.

In one embodiment, the printed version of the table of content may originally include only a start page number against a highlighted topic or sub-topic. In such an embodiment, the user may write an end page number of the highlighted topic or sub-topic along with the start page number. The start page number and the end page number may be separated by a hyphen in such a manner to indicate a range of pages corresponding to the highlighted topic or sub-topic. Therefore, in the present embodiment, the receiving module 206 may obtain the printed version of the table of content having a hand-written end page number of the highlighted topic or sub-topic separated from the start page number by a hand-written hyphen.

In another embodiment where the printed version of the table of content may originally include only the start page number against the highlighted topic or sub-topic, the controller 210 may identify a start page number of subsequent topic or sub-topic of the document. Based on the identification, the controller 210 may determine the end page number of the highlighted topic or sub-topic, based on the start page number of the subsequent topic or the sub-topic.

In yet another embodiment, the printed version of the table of content originally may include the start page number and the end page number, the start page number and the end page number are separated by a hyphen against the highlighted topic or sub-topic. In such an embodiment, a hyphen between the start page number and the end page number can indicate a range of pages corresponding to the highlighted topic or sub-topic. Therefore, in the present embodiment, the controller 210 may obtain the printed version of the table of content having a hyphen between the start page number and the end page number to split and identify the start and end page numbers.

The scanning module 208 scans the printed version of the table of content having the one or more highlighted topics. The scanning module 208 generates a scanned copy (i.e., an e-copy or electronic copy) of the table of content. The scanning module 208 then passes the scanned copy of the table of content to the OCR module 212. The table of content including the highlighted topics may be scanned using a gray scale scanner or a color scanner.

The Optical Character Recognition (OCR) module 212 performs OCR on the scanned table of content to identify the one or more topics that are highlighted by the user. The Optical Character Recognition (OCR) module 212 further extracts the highlighted topics from the scanned table of content. The extracted highlighted topics are stored in the temporary memory 216 of the multi-function device 202.

The controller 210 then parses the highlighted topics one by one to identify main content corresponding to each highlighted topic. The controller 210 matches the topic text with main content present in the document stored in the temporary memory 216 of the multi-function device 202. For example, the controller 210 uses one or more text phrases to identify main content corresponding to the highlighted topics. In other example, the controller 210 uses page numbers corresponding to each topic to identify the main content present in the document. The identified content is then saved in the temporary memory 216 of the device 202. Once this is performed, the main content corresponding to each topic as highlighted by the user is transmitted to the print engine 214 of the multi-function device 202.

The print engine 214 then prints the identified main content based on the one or more topics as highlighted by the user. In this manner, the system 200 prints the selective portions of the document.

As discussed above, the receiving module 206, the scanning module 208, the controller 210, the OCR module 212, the print engine 214, and the temporary memory 216 may be implemented as one or more microprocessors, microcomputers, microcontrollers, digital signal processors, central processing units, state machines, logic circuitries, configurable hardware units, and/or any devices that manipulate signals based on operational instructions. Among other capabilities, the receiving module 206, the scanning module 208, the controller 210, the OCR module 212, the print engine 214, and the temporary memory 216 are configured to fetch and execute computer-readable instructions and data stored in a storage unit (not shown in the figure).

Exemplary Table of Content

In one embodiment, the table of content may not include or mention the end page number along with the start page number against a highlighted topic or sub-topic. In such an embodiment, the controller 210 may detect the highlighted topic or sub-topic to be the last topic or sub-topic of the document. Therefore, the controller 210 may identify a portion of the document corresponding to the highlighted topic or sub-topic starting from the start page number to the last page of the document.

In one embodiment, the highlighted topic or sub-topic may be starting in the middle of a corresponding page of the document. In such an embodiment, the controller 210 may ignore content included on the page before beginning of the highlighted topic or sub-topic. In another embodiment, the highlighted topic or sub-topic may be ending in the middle of a corresponding page of the document. In such an embodiment, the controller 210 may ignore content included on the page after ending of the highlighted topic or sub-topic. Therefore, the print engine 214 may not print the ignored content while printing the highlighted topic or sub-topic.

In one example, a document includes topics 1, 2, 3, 4, 5, and 6 listed in a corresponding table of content. Further, the topic 2 includes a sub-topic 2.1 and 2.2. Similarly, the topic 5 includes a sub-topic 5.1, 5.2, and 5.3. After outputting the printed version of the table of content, the user highlights the sub-topic 2.2, the topic 4, the sub-topic 5.1, and the sub-topic 5.3. The controller 210 may detect the sub-topic 2.2, the topic 4, the sub-topic 5.1, and the sub-topic 5.3 as highlighted topics/portions and subsequently, identifies, extracts and prints content corresponding to the sub-topic 2.2, the topic 4, the sub-topic 5.1, and the sub-topic 5.3.

In one example, content of the document corresponding to the sub-topic 5.1 may be ending in the middle of a corresponding page and content of the document corresponding to the sub-topic 5.2 may start after the ending of the sub-topic 5.1. In such an example, the controller 210 may ignore the content of the sub-topic 5.2 and therefore, may not print the content of the sub-topic 5.2.

In another example, content of the document corresponding to the sub-topic 5.3 may start from the middle of the corresponding page subsequent to ending of the content of the document corresponding to the sub-topic 5.2. In such an example, the controller 210 may ignore the content of the sub-topic 5.2 on the page while printing the content of the sub-topic 5.3. Further, the controller 210 may move the content of the sub-topic 5.3 at the top of the page during printing.

Exemplary Flow Diagram and User Interface

Figure 3A:
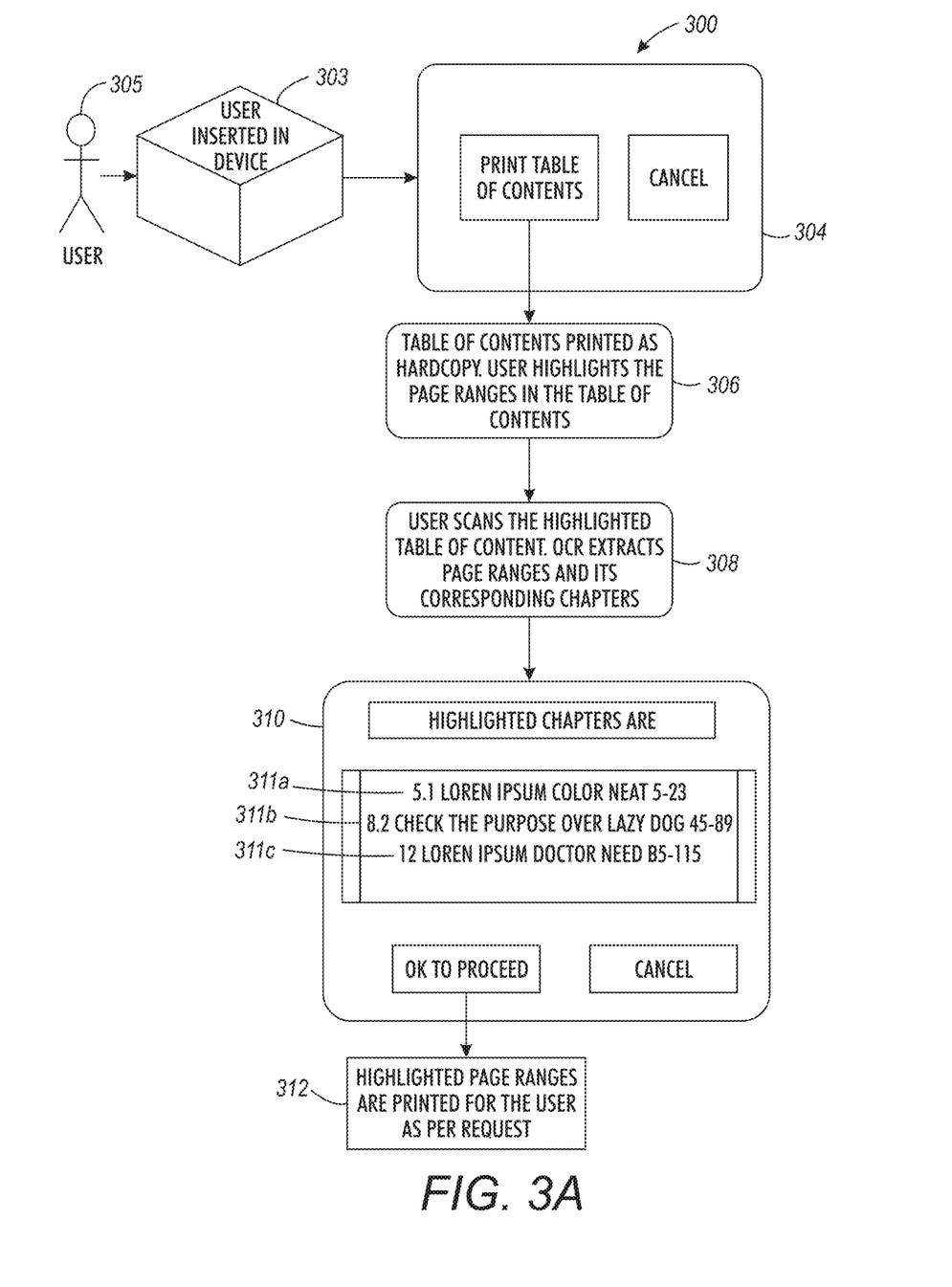
FIG. 3A shows an exemplary diagram for printing selective portions of a document and FIG. 3B illustrates an exemplary table of content shown to a user, according to one or more embodiments of the present disclosure.
Figure 3B:
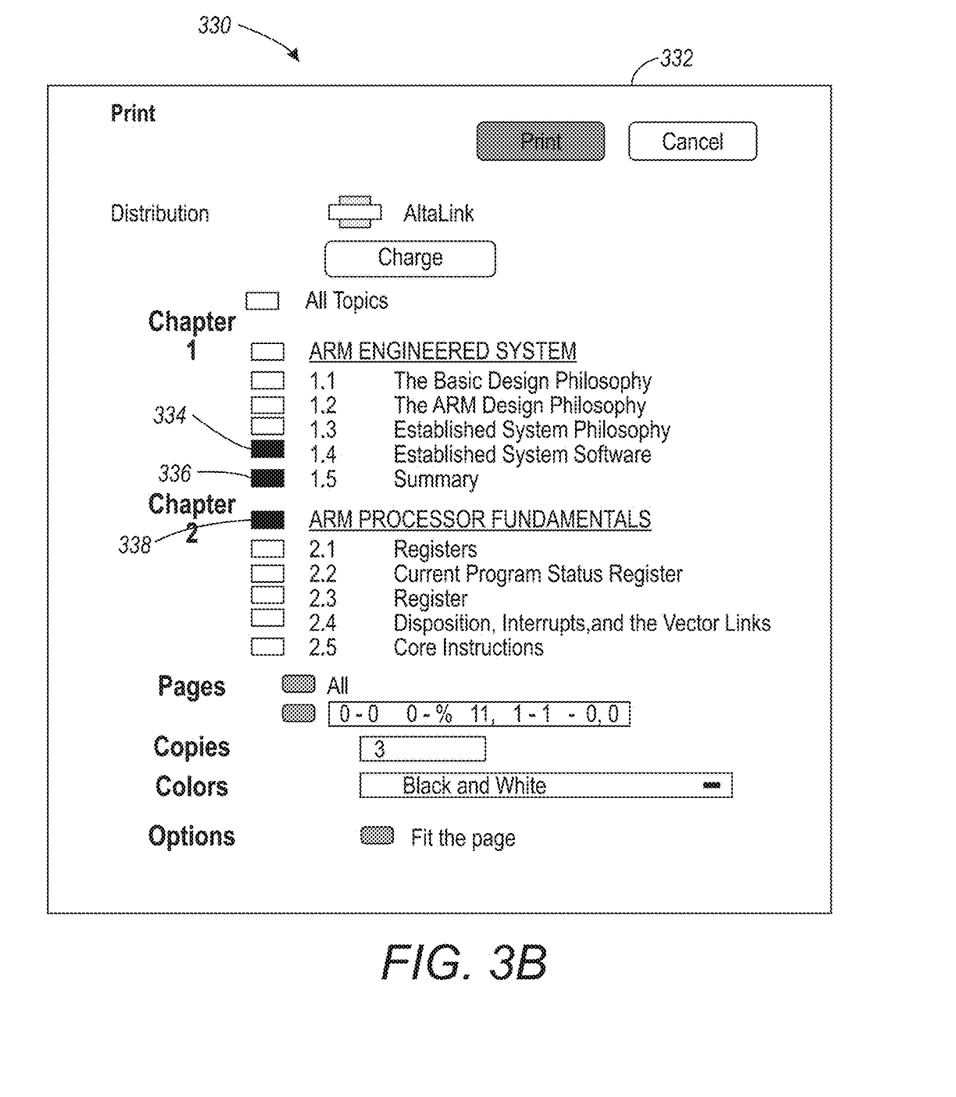

FIG. 3A shows a flow diagram 300 for printing a document stored in a removable storage device such as USB. The user 305 inserts the USB in a printer 303. A prompt (shown as 304) is generated for the user 305 to print the table of content. As shown, the prompt 304 includes two options "print table of content" and "cancel". When the user 305 selects the option—Print Table of Content, then table of content is printed as hard copy and the user 305 highlights the page ranges in the table of contents, at block 306. At 308, the user 305 scans the highlighted TOC and the printer 303 performs OCR to extract the page numbers and corresponding chapters. Then, the highlighted topics/chapters are displayed (marked as 310) via a user interface, marked as 311a, 311b, ad 311c. When the user 305 clicks OK, highlighted page ranges are printed for the user, at 312. FIG. 3B shows a snapshot 330 of a user interface 332 indicating the table of content for printing. The user interface 332 allows the user to modify the chapters for the printing. In addition to the earlier highlighted topics, if the user wants, he can add or modify chapters for printing via the shown user interface 332. The selections are shown as 334, 336 and 338.

Exemplary Flowchart

Figure 4:
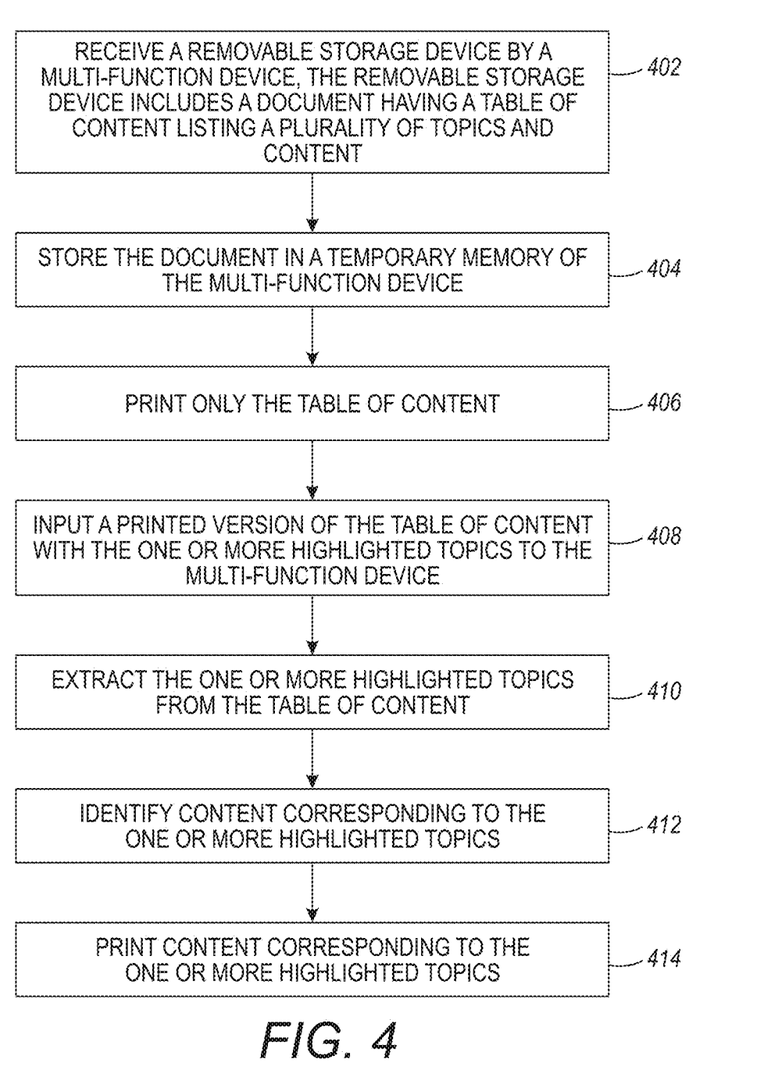
FIG. 4 illustrates an exemplary method for printing of selective portions of a document, according to one or more embodiments of the present subject matter.

FIG. 4 shows an exemplary computer-implemented method 400 for printing selective portions of the document stored in a removable storage device coupled to a printing device, according to one or more embodiments of the present subject matter. The document is a large sized document having multiple topics/chapters and a user wants to print one or more topics. In such cases, the user highlights the one or more topics and thereafter, only content corresponding to the highlighted topics is printed. In this manner, the selective portions are printed. For the sake of brevity, features of the disclosure that are already explained in the description of FIG. 1, FIG. 2, and FIGS. 3A and 3B are not explained in detail in the description of FIG. 4 and thus, FIG. 1, FIG. 2, and FIGS. 3A and 3B can be referred to. The order in which the blocks of method 400 are described is not intended to be construed as a limitation, and any number of the described method blocks can be combined in any order to implement the method 400, or an alternative method. Additionally, individual blocks may be deleted from the method 400 without departing from the spirit and scope of the subject matter described herein. Furthermore, the method 400 may be implemented in any suitable hardware, machine readable instructions, firmware, or combination thereof.

As an example, the method may be implemented by a multi-function device, a printer or at least one processor or any equivalent device. Any removable device such as USB etc. is coupled to the multi-function device, or the printer.

The method begins with when a user wishes to print a selective portion of a document stored in a removable storage device such as Universal Serial Bus. The document is a multi-page document such as book, but other variations may also be implemented. For example, the document includes ten chapters but the user wishes to print only two chapters. The document includes a heading, a table of content and main content. The heading represents the title of the document. The table of content includes various topics or sub-topics present in the document. The topics may include corresponding page numbers, for example, a starting page number, or starting page number and ending page number of the topic.

At 402, a removable storage device is received by a multi-function device, the removable storage device includes a document having a table of content listing a plurality of topics and content corresponding to each topic. Upon receiving the removable storage device, the document is copied from the removable storage and is stored in a temporary memory of the multi-function device at 404. Then, an option is automatically displayed to the user for printing the table of content, upon detecting the document in the removable storage device.

The document is analyzed to identify the table of content. The table of content is identified based on one or more text recognition/identification techniques. For example, the table of content is identified based on various phrases such as table, table of content, index, or the like. The end of table of content may be identified using whitespace and newline characters. The table of content is extracted. The extraction includes splitting the table and topic contents into a restructured format, the restructured format is stored in a lookup table. The restructured format includes the table of content as well as mapping of each topic with the topic content. The restructured format may be referred to further identification, extraction and processing. The restructured format may be stored in a temporary memory of the device.

Thereafter, only the table of content is printed at 406. The table of content is printed automatically, while the table of content may be printed based on an instruction from the user. In the later scenario, the table of content may be printed based on page numbers or page ranges as provided by the user. The user then collects the printed table of content, and thereafter one or more topics from the printed table of content are highlighted by a user. The highlighted topics indicate the content that the user wishes to print.

Here, the printed version of the table of content with the highlighted topics is input by the user to the multi-function device at 408. The table of content with the highlighted topics is received for scanning and the scanning process is initiated. The table of content is identified based on formatting of the table of the content. Then, Optical Character Recognition (OCR) is performed to identify the one or more highlighted topics. Once identified, the highlighted topics are extracted from the table of content at 410. The extracted highlighted topics are temporarily stored.

Thereafter, content corresponding to the highlighted topics is identified at 412. Here, one or more pages containing content corresponding to the highlighted topics is identified. The content is identified based on matching the highlighted topics with the content section of the document stored in temporary memory of the multi-function device. For example, the text of the highlighted topics is searched in the content section of the document. The content corresponding to the highlighted topics may be identified based on page numbers as provided next to the highlighted topics in the table of content. In other words, the content is identified based on matching at least one of the highlighted topics and corresponding page numbers with the content section of the document.

Upon identification, the content corresponding to the highlighted topics is extracted. Finally at 414, the content corresponding to the highlighted topics is printed. Or the pages containing the content corresponding to the highlighted topics is printed.

In some embodiments, content matching or page number matching techniques may be used to identify and extract content corresponding to the highlighted topics.

Exemplary Case Scenarios

In some embodiments, the page numbers are represented by hyphenated ranges (e.g., 10-22) in the table of content in some documents, while some documents may not have hyphenated ranges but only have the starting page number. In all such cases, the user highlights required content and includes a hyphen and an end page number. If the last chapter is to be printed, then user need not include any page ranges/hyphenated content. In addition, if no hyphenated page ranges are mentioned in the table of content by the user, then the page range may be considered till the end of document.

In one embodiment, the printed version of the table of content may originally include only a start page number against a highlighted topic or sub-topic. In such an embodiment, the method 400 may include obtaining the printed version of the table of content having a hand-written end page number of the highlighted topic or sub-topic separated from the start page number by a hand-written hyphen.

In another embodiment, the printed version of the table of content may originally include the start page number and the end page number against the highlighted topic or sub-topic. In such an embodiment, the method 400 may include obtaining the printed version of the table of content having a hand-written hyphen between the start page number and the end page number. In one embodiment, the device 202 may obtain the printed version of the table of content having the at least one topic or sub-topic highlighted in the visible color.

In one embodiment, the end page number may not be mentioned along with the start page number against the highlighted topic or sub-topic. In such an embodiment, the method 400 may include printing the portion of the document corresponding to the highlighted topic or sub-topic starting from the start page number to the last page of the document. In one embodiment, the printing engine 214 may print the portions of the document.

If only starting page number is available in the table of content next to the topic/chapter name, user enters/inputs the ending page number separated by a hyphen ('-'), for example, 23-40.

If the starting page number and ending page number is available next to the topic/chapter name (e.g., [5-10]) in the table of content, the starting and ending page number can be separated by split of '-'.

If the user includes the final chapter of the document, then there is no need to include the ending page number. If there is no ending page number, then document is printed till the end (assuming it as the end chapter).

In cases, where the document does not contain table of content (TOC), the methods and systems analyze the document. For example, the TOC may be created based on chapter starts and ends. The chapter starts and ends makes use of the font size of the chapter description, position of text and space/gap in between the chapters.

If there is no text available as index, table of contents and contents, then the methods and systems search for the table format within the scan of a few pages. The table format contains the chapter description along with the page numbers to identify the table of content.

A person skilled in the art will readily recognize that steps of the method 400 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described method 400. The program storage devices may be, for example, digital memories, magnetic storage media, such as a magnetic disks and magnetic tapes, hard drives, or optically readable digital, data storage media.

The present disclosure is discussed with respect to printing, but the disclosure can be extended to copy jobs. The user here scans all the contents of a copy job such as a book and may or may not save it. The device identifies the table of contents using keywords like Table of Contents, Index. The device then prints the Table of Contents as a hardcopy. The user can then highlight the required content and may/may not include page range based on the table of content. The printed table of contents with highlights is then scanned back by the user. The device then prints the contents under the page ranges.

Further, the methods and systems may be integrated into a document analyzer. The document analyzer interacts with OCR to perform document analysis in the scanned content. The document analyzer runs through the entire table of content. It then calculates the corresponding page numbers from Table of Contents. The document analyzer may also be programmed to automatically add the ending page number (based on analyzing the starting page number of next chapter). If no next chapter is available, then document analyzer assumes that as the last chapter and prints till the end of the document.

The present disclosure discloses methods and systems for selective printing of a document, i.e., printing based on highlighting. The disclosed methods and systems offer a comprehensive and effective approach for printing selective portions of documents. The disclosed methods and systems eliminate requirement of a print driver, a computing device, or the Internet connectivity for selective printing of the document. Further, the system facilitates printing of only those portions of the document that are required, therefore the present disclosure prevents wastage of the pages as well as of the toner and further minimizes electricity consumption and overall cost associated with printing. Moreover, inconvenience associated with handling of a printed copy of the complete document and subsequent hand-picking of relevant portions is eliminated.

The present disclosure may be implemented by a general purpose computer, a special purpose computer optimized for image processing operations, or a combination of a general purpose computer and auxiliary special purpose hardware.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "extracting," or "displaying," or "storing," or "printing," or "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving a non-transitory removable storage device by a multi-function device, wherein the non-transitory removable storage device comprises a document having a table of content listing a plurality of topics and content corresponding to each topic;
   storing the document in a temporary memory of the multi-function device;
   identifying the table of content in the document based on one or more text recognition techniques;
   printing only the table of content, wherein one or more topics of the plurality of topics are highlighted by a user in the printed version of the table of content;
   receiving the printed version of the table of content with the one or more highlighted topics, for scanning;
   identifying the one or more highlighted topics from the printed version of the table of content;
   identifying content corresponding to the identified one or more highlighted topics; and
   printing the identified content, the identified content corresponds to the one or more highlighted topics.

2. The method as claimed in claim 1, further comprising extracting the one or more highlighted topics.

3. The method as claimed in claim 1, further comprising performing Optical Character Recognition (OCR) to identify the one or more highlighted topics.

4. The method as claimed in claim 1, further comprising automatically displaying an option to print the table of content.

5. The method as claimed in claim 1, further comprising printing the table of content automatically.

6. The method as claimed in claim 1, further comprising displaying the one or more highlighted topics to the user.

7. A computer-implemented method for printing selective portions of a document stored in a non-transitory removable storage device coupled to a printing device, the computer-implemented method comprising:
   receiving a document via a non-transitory removable storage device, the document having a table of content and content section, wherein the table of content comprises a plurality of topics and corresponding page numbers;
   analyzing the document to identify the table of content;
   automatically displaying an option to print the table of content;
   extracting the table of content from the document;
   printing the extracted table of content, based on an instruction from a user;

receiving a printed version of the table of content having at least one topic and corresponding page numbers highlighted in visible color, for scanning;

detecting the at least one highlighted topic and corresponding page number;

identifying content corresponding to the at least one highlighted topic and corresponding page number;

extracting content corresponding to the at least one highlighted topic and corresponding page number; and printing content corresponding to the at least one highlighted topic.

8. The computer-implemented method as claimed in claim 7, further comprising storing the document in a temporary memory of the printing device.

9. The computer-implemented method as claimed in claim 7, wherein the table of content is printed automatically.

10. The computer-implemented method as claimed in claim 7, wherein the table of content is printed based on one or more page numbers as specified by the user.

11. The computer-implemented method as claimed in claim 7, further comprising extracting content corresponding to the at least one highlighted topic and corresponding page number.

12. The computer-implemented method as claimed in claim 7, further comprising matching at least one of the at least one highlighted topic and corresponding page number with the content section of the document stored in the printing device.

13. A system comprising:
a non-transitory removable storage device for communicatively coupled to a multi-function device, the non-transitory removable storage device comprises a document having a table of content listing a plurality of topics and content corresponding to each topic; and
the multi-function device comprising one or more modules configured for:
storing the document in a temporary memory of the multi-function device;
identifying the table of content in the document;
printing only the table of content, wherein one or more topics of the plurality of topics are highlighted by a user in the printed version of the table of content;
receiving the table of content with the one or more highlighted topics for scanning;
performing Optical Character Recognition (OCR) to identify the one or more highlighted topics in the table of content;
identifying content corresponding to the identified one or more highlighted topics; and
printing the identified content, the identified content corresponds to the identified one or more highlighted topics.

14. The system as claimed in claim 13, wherein the multi-function device is configured for extracting the one or more topics highlighted in the printed version of the table of content.

15. The system as claimed in claim 13, wherein the multi-function device is configured for displaying an option to print the table of content.

16. The system as claimed in claim 13, wherein the multi-function device is configured for printing the table of content automatically.

17. The system as claimed in claim 13, wherein the multi-function device is configured for printing the table of content based on an instruction from the user.

18. The system as claimed in claim 13, wherein the multi-function device is configured for matching the one or more highlighted topics with the content of document.

19. A multi-function device for printing a selective portion of large-sized document present in a non-transitory removable storage device, the multi-function device configured for:
receiving a document via a non-transitory removable storage device, the document having a table of content, wherein the table of content comprises a plurality of topics;
printing only the table of content;
receiving a printed version of the table of content having at least one topic highlighted in visible color, for scanning;
detecting the at least one highlighted topic from the printed version of the table of content;
identifying content corresponding to the at least one highlighted topic; and
printing content corresponding to the at least one highlighted topic.

20. The multi-function device as claimed in claim 19, is further configured for identifying and extracting the table of content.

* * * * *